S. BENTZ.
Hulling Machine.
No. 34,346.
3 Sheets—Sheet 2.
Patented Feb. 11, 1862.
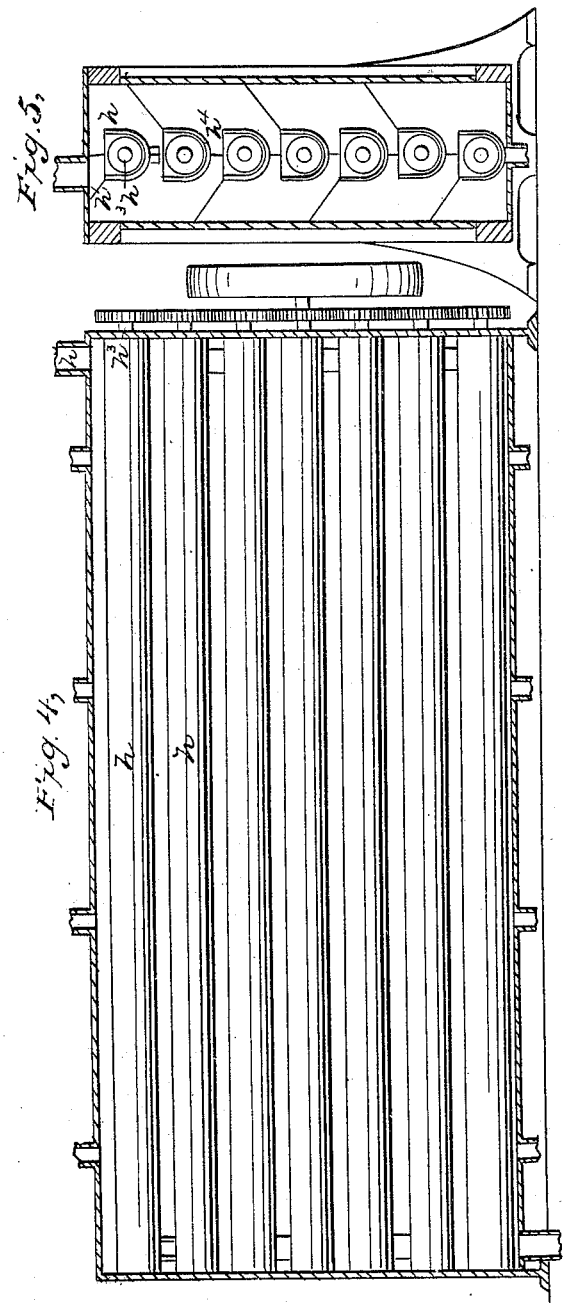
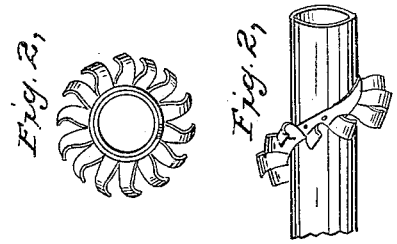
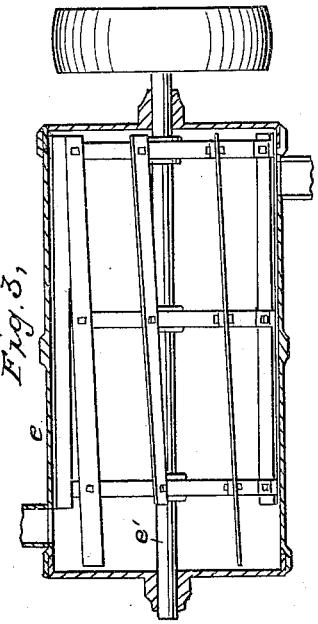
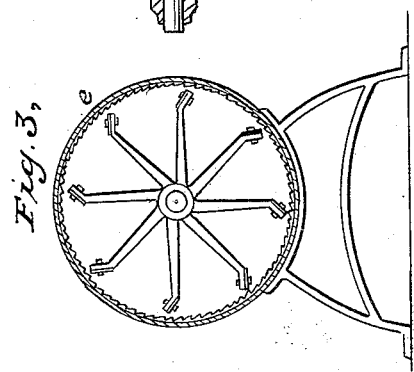

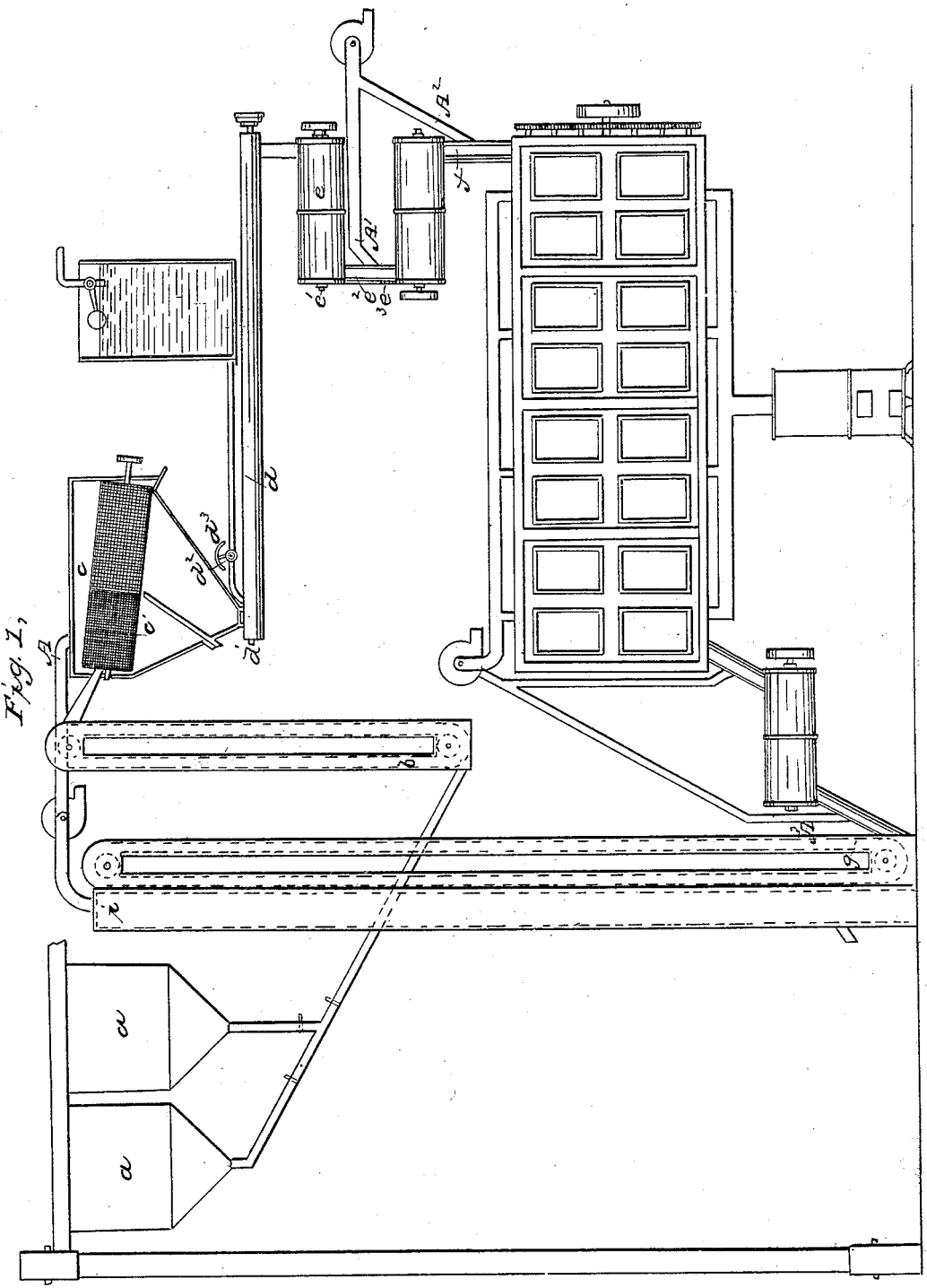

S. BENTZ.
Hulling Machine.
No. 34,346.
3 Sheets—Sheet 3.
Patented Feb. 11, 1862.
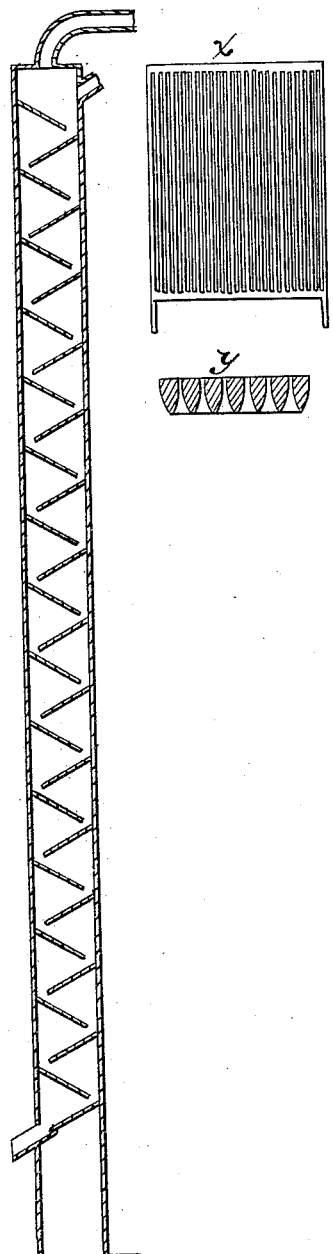
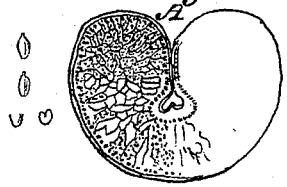
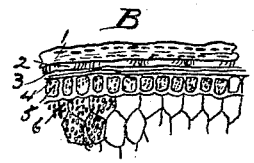
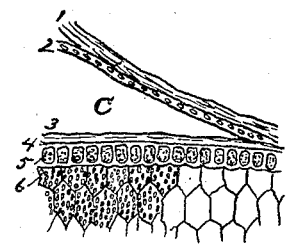
WITNESSES
INVENTOR

UNITED STATES PATENT OFFICE.

SAMUEL BENTZ, OF CARROLL COUNTY, MARYLAND.

IMPROVED HULLING-MACHINE.

Specification forming part of Letters Patent No. 34,316, dated February 11, 1862.

*To all whom it may concern:*

Be it known that I, SAMUEL BENTZ, of the county of Carroll and State of Maryland, have invented certain new and useful Improvements in Machinery for Preparing Wheat and other Grains for Grinding and other Purposes; and I do hereby declare and ascertain my said invention, referring to the accompanying drawings, in which—

Figure 1 is a side elevation of the principal machinery and apparatus as placed within a building for use on the plan of my improvement. Fig. 2 represents the shaft of the conveyer, showing the flights or wings. Fig. 3 represents the interior parts of the "unbranner" developed, showing the details of construction. Fig. 4 represents the interior of the drying apparatus in vertical longitudinal section. Fig. 5 represents a vertical cross-section. Fig. 6 represents the cooling apparatus. Fig. 7 represents a series of sections of a grain of wheat highly magnified.

By a prior invention, for which I obtained Letters Patent of the United States, dated on the 19th day of September, A. D. 1848, and entitled "Improvement in hulling wheat preparatory to grinding," I discovered several important improvements in preparing cereals based upon their organic structure and chemical composition, by which I can remove that portion of the outer coating or husk of the kernels of grain which contains no nutritious principles and retain all that part of the grain which is valuable for food. Long experience with extended experiments made at great expense has proved this discovery to be of great value; but there were many mechanical difficulties to be overcome in order to make the original invention practically available.

To this end my present improvements have been made, to fully understand which it is proper to explain the natural formation of the grain and what is to be effected by the machinery.

When a cross-section of a grain of wheat is seen under a microscope of moderate magnifying power, it presents an appearance as shown at A, Fig. 7. If a portion of a section be submitted to a very powerful magnifier, it exhibits, as shown at B, Fig. 7, four investing coats or coverings, of which 1 is the outer coat of the true husk, with a double layer of cells whose greatest diameters are parallel with the axis of the kernel. 2 is the inner coat of the true husk, with a single layer of cells at right angles to those of the outer coat. Both these coats of true bran or husk proper are organized cellular tissues. 3 and 4 are the proper teguments of the gluten-cells and are films of "cellulose," (the material of which cells are formed,) but without any discoverable cellular structure. A layer of cells containing gluten 5 and cells containing starch, (with a little gluten,) which compose the interior of the grain 6. The husk adheres very tenaciously to the teguments and gluten, so much so that in the ordinary mode of grinding wheat the entire layer of gluten-cells is detached from the grain and separated with the husk in the bolting, thus leaving on the true bran a portion of valuable material which should be retained in the flour. Besides this, the miller, to avoid cutting up the bran and producing speckiness in the flour, often loses by too high grinding a considerable adhering-layer of starch-cells.

By my machine I peel off the cellular coats, as shown at C, Fig. 7, leaving the polished surface of the gluten and its teguments entirely stripped of the innutritious husk, (except a small proportion inclosed within the crease or furrow of the kernel, where its two lobes come in contact, as shown at A, Fig. 7, which, after grinding, is separated by bolting,) as well as of all adhering impurities, particularly of dust, smut, &c., so that the whole kernel may be pulverized into flour which will be free from speckiness and impurities and rendered more nutritious by the saving of gluten. By the absence of specks of bran (which possesses the property of producing fermentation) it will keep sweet longer, especially in hot climates, and by the presence of an additional percentage of gluten it becomes what the bakers term "stronger," carries more water, and makes more and better bread.

In my former patent I explained that the true husk (represented at B, Fig. 7, 1 2) had a greedy affinity for water, while the interior teguments and gluten-cells were not quickly acted on by dampness, and in order to avail myself of these peculiarities to effect the purpose of hulling I first thoroughly moistened the husk and then immediately removed it, to do which it was found necessary to devise large and rapidly-acting machinery to operate upon a sufficient quantity of grain to make it practical. The apparatus must have the qualities of strength, durability, and cheapness, and be so constructed as to perform the hulling process perfectly without injuring the kernels of grain that are passed through it.

To effect the end just mentioned is the object of my present invention.

It consists of several machines, together with other necessary apparatus, all of which is more or less useful in completing the operation of hulling and preparing the grain for the market or for grinding or other purposes.

In the succeeding description we will follow the grain from the garners $a$ $a$, into which it is previously conveyed by elevators or otherwise for storage, through each process to its delivery in a merchantable state, hulled and dry, fit for use.

The grain is drawn from the garners $a$ $a$ through a spout at the bottom. If this point is below the screen, it is elevated thereto by elevators $b$ of common construction and well known in milling. The cylindrical screen $c$ separates it from small seeds, dust, chaff, and other small foreign bodies, and also from such large foreign bodies as might otherwise injure the machinery in the succeeding processes. To effect this, the first section of the screen is a fine sieve of wire $c'$, through which the fine seeds, &c., are discharged from the grain, which goes forward in the screen to the next section, which is covered with a coarse wire sieve, through which the grain passes, leaving the larger foreign bodies to be projected out at the end of the screen. The light dust and particles, which will float in the air within the case of the screen, are drawn off through a pipe A by means of an exaust-fan, hereinafter described. The "wet conveyer" next receives the grain from the screen through a spout. This wet conveyer is a long horizontal semi-cylindrical or other conveniently-formed trough $d$, in which a shaft $d'$ is located extending from end to end, upon which flights or wings are affixed radially and in a spiral line around the shaft from end to end of the trough. These flights have their surface next the shaft inclined on the spiral line, but their outer ends are twisted nearly into a line parallel with the shaft, so as to present a winding surface, in addition to which the extreme ends are curved, so as to form scoops for the purpose of raising the grain and throwing it over the shaft, by which the mass of grain is thoroughly stirred up and the husk saturated with the water that enters with it into the wet conveyer at one end before it reaches the opposite end, where it is discharged. A proper quantity of water is let into the wet conveyer along with the grain from a proper reservoir in which the water is always kept at a determined level by a ball-cock or other like contrivance that regulates the supply, so as to equalize the discharge into the wet conveyer, the quantity of water admitted being regulated by an index $d^3$, connected with the stop-cock $d^2$, near the discharging end of the pipe leading from the reservoir. This index is adjusted by a scale over which it sweeps. The velocity of the shaft and the rapidity of the progress of the grain through the conveyer consequent thereon may be determined by a cone of pulleys on which the driving-belt runs, so as to allow hard thick-skinned wheat or other grains to remain longer in the conveyer than might be found necessary for thin-skinned grains, the husk of which would sooner become thoroughly moistened. When the grain reaches the end of the conveyer opposite that at which it entered, its husk is sufficiently moistened, and it is discharged through a spout to the next apparatus.

The unbranner is the machine which performs the most important and difficult office in the process, the requirements being to rub the husk off from each and every kernel of grain without injuring or breaking it. I therefore find it best to duplicate this apparatus, passing the grain first through one machine and then through another. The unbranning process is best performed by the attrition of one kernel upon another under pressure; and to make the process practical it must be done rapidly and in an apparatus that will perform a large amount of work in a short space of time. For this purpose I devised my unbranner as follows: The case $e$ (see Figs. 1 and 3) is a horizontal cylinder of cast-iron fluted longitudinally on the inner surface. At the center there is a shaft $e'$, having bearings at each end and projecting beyond the heads of the cylinder sufficiently to receive a pulley upon it, by which it is rotated by means of a band and gearing from the prime mover. Upon the shaft $e'$ arms are affixed which extend out radially to within a few inches of the inner circumference of the cylinder. Their ends are made to incline backward from a vertical line in the course of their revolution. I propose to place three sets of these arms (more or less) according to the size of the machine and judgment of the maker, each set to be made of eight arms corresponding with the number of wings which are affixed thereto. These wings should be made of thin plates of wrought-steel, that are inclined with the ends of the arms above named, to which they are bolted, and the arms of one set being a little in advance of the succeeding ones on the shaft the wings assume a somewhat spiral position on a line which experience will determine. The nearer they run parallel to the shaft the slower will the grain be advanced in the cylinder, and vice versa. There are slots or elongated holes through the ends of the arms that receive the bolts which fasten the wings thereto, so that the wings may be set out or in to enlarge or contract the space between them and the cylindrical case. This space should be about three-quarters of an inch, more or less, the rule being the lighter the feed the less space required. If the grain is fed in at the upper side of the cylindrical case, the first set of arms next to where the grain enters are placed beyond the feeding-point, as clearly seen in the drawings, and every other one of the wings projects beyond the arm thus situated to the end of the case, while the intermediate wings terminate at the arms. This construction is necessary to prevent the wings from resisting too strongly the proper entrance of the grain for the required feed. At the opposite or discharge end of the cylinder the wings all extend out to the full length, which facilitates the discharge of the grain therefrom. The moistened grain from the wet conveyer enters at or near the end of this machine, which should have its shaft revolving at a velocity of about four hundred revolutions per minute. As the grain enters this cylinder it assumes the position of a layer all around the inner surface of the cylinder, the rapidly-moving backward inclined wings tending to aid the centrifugal action and producing a proper amount of compression and attrition of the kernels of grain upon each other and against the case and wings, by which the moist husk is effectually loosened from the kernels of grain without injury thereto. The grain is at the same time advanced to the other end of the horizontal cylindrical case by the inclination of the wings in a spiral or inclined line from end to end. When the grain reaches the other end of the cylinder, it is discharged into a spout at $e^2$ and passes downward into a second unbranner constructed precisely like the first. On the passage of the grain from the first to the second unbranner, if it is designed to remove the wet bran or husk from it, I connect with the spout $e^2$ an exhaust-pipe A′, extending upward at an acute angle from said spout. On the opposite side of this spout, a little below where the pipe A′ enters, there is an opening $e^3$ into the external air, through which an ascending current is drawn to supply the pipe A′. This opening $e^3$ is covered with wire-cloth to prevent the escape of the contents of the pipe. The draft through these openings is produced by an exhaust-fan, hereinafter described, by means of which the moist husks and other light foreign matters which have been detached from the kernels of grain in the first unbranner are drawn off.

In the second unbranner (constructed precisely like the first) those husks and portions thereof that have escaped being removed in the first unbranner are removed, and the work so far perfected. The grain leaves this cylinder at the spout $f$, in which it is subjected to another current of air to winnow the remaining bran, &c., which is drawn through a pipe $A^2$, precisely similar to the one just described. The importance of the opening (protected by wire-cloth) in this spout $f$ is very great where this spout leads directly into the drying apparatus, as if the exhaust-pipe were denied a liberal supply of outer air it would draw up heated air from the drying-chamber and perhaps interfere with a proper regulation of the temperature and current through the drier. The grain thence descends into the drier, or if it is more convenient to place the drier too high for this, then into the bottom of an elevator that carries it up into the drier.

It is here proper to state that in general I deem it best to separate the bran, as above described, especially when the grain is infected with smut or is musty; but when wheat is sound millers sometimes desire to dry the outer bran in order to mingle it with the returns from the bolting-cloth, which diminishes its richness but increases its bulk for cheap feed. To effect this the pipes A′ $A^2$ are cut off from the spouts by slide-valves, or otherwise closed, and the bran passes through with the grain to the drier.

The drying apparatus consists of a rectangular chamber, the walls of which may be made of wood, lined with sheet-iron, within which is a series of semi-cylindrical troughs $h$, the sides of which are extended up, as seen in cross-section, Fig. 5. These troughs $h$ are placed one above another, and from the top edge of the upper trough a sheet-iron partition $h'$ extends in an upward inclined-direction to the side of the chamber on one side. The second trough has a similar partition extending up on the opposite side. All the troughs below have similar attachments from alternate sides, so that a current of air entering at the bottom of the chamber will be made to pass around over and into the troughs, as it ascends in a zigzag course from side to side until it reaches the top. The object of giving an inclination to the intercepting alternating partitions is to allow any grains that may chance to be thrown out of the troughs to fall back again. The air is supplied from a heating-furnace below, from which it flows into the drier, distributed by as many conducting-pipes as the length of the drying-chamber may require to supply it evenly throughout. The current is aided by exhaust-pipes at top of the drier connecting with the fan above named. The troughs $h$ extend from end to end of the chamber and are connected one with the other by short spouts, as clearly seen in Figs. 4 and 5. To bring the current of air as it passes around over the top of the troughs into contact with the grain therein, (or grain and husk, if both are being dried together,) I affix along the bottom of the troughs at the vertical center line a partition-plate (or curtain) $h^4$, that descends to a line with the top of the next trough below, or within about an inch of the circle described by the outer ends of the flights on the shaft as it revolves, as explained hereinafter. This forms a partition under which the air must dive, and thus a more intimate contact of the air is secured, with the individual grains thrown up and over the shaft as the mass is agitated by the flights or wings which carry it forward, by which means the drying effect is greatly increased. Within each of these troughs a shaft $h^3$ is placed extending from end to end and supported on proper bearings. From this shaft are projected wings in a spiral line, of the form particularly described above in the description of the wet conveyer. The shafts are all driven by proper gearing connected with the driving-power. The grain enters from the unbranner at one end of the upper trough at $h^5$, and is conveyed by the revolution of the shaft and spiral wings to the opposite end, whence it descends to the second trough through the spout that unites them. The second shaft then conveys it to the opposite end of the second trough, and it again descends through the spout to the next or third trough, and thus proceeds onward to the bottom trough, whence it is discharged. The flights or wings keep the grain constantly stirred up and agitated while conveying it forward, which permits the current of air to act upon every grain in the whole mass during its progress and to carry off all the moisture therefrom before it passes out of the drier. By aiding the natural current of heated air through the drier by employing the exhaust a double purpose is effected—a larger volume of air is passed through the machine and the temperature is reduced, by which the maximum effect is produced with a given quantity of fuel and the minimum degree of heat for the best results. The air is used to bring the requisite heat to the grain to evaporate the moisture, and at the same time offers itself as the vehicle for carrying the moisture away as rapidly as it is disengaged. From the drying apparatus the grain passes through a spout to the polisher.

The polishing-machine receives the grain from the drying apparatus and finishes the operation of unbranning (or hulling) by polishing the surface of the dry kernels of grain and removing any adhering speculæ of true bran or small particles of foreign matter. This polisher is constructed like the unbranners in all particulars; but as the grain is more brittle when perfectly dry it is necessary to run it more slowly, (about two hundred and seventy-five revolutions.) With this reduced motion it is necessary to incline the wings more spirally to the plane of the axis to increase the discharging power up to that of the more-rapidly revolving unbranners. On leaving this polisher through the exit-spout an air-current like that connected with the unbranners is drawn up through a pipe $A^3$ for removing all the bran, &c., from the last process. Thence the grain descends through the spout to the elevator $g$, and is carried up to the top of a cooler $i$, through which it descends through a current of cool air, and on reaching the bottom it enters a second elevator $g'$, and is raised to the top of a second cooler, through which it descends and is discharged in merchantable condition.

The coolers are constructed as follows: Long narrow square spouts or boxes $i$ stand in a vertical position, as clearly represented at Figs. 1 and 6, in the interior of which are grated partitions. (Seen detached at $x$, Fig. 6, in an enlarged view.) These partitions rest in an inclined position, the upper edge against the side of the box, the opposite lower edge terminating a small distance—say two inches, more or less—from the opposite side of the box. Two legs or projections extend beyond the lower edge on either side to the side of the box to hold the partition in place conveniently. This form is clearly seen in the detached drawing $x$, Fig. 6. The grating is made of cast-iron, the bars being about three-sixteenths of an inch wide and three-eighths of an inch thick, running up and down. These bars are level on top, with a space of about one-sixteenth of an inch between them, which will not allow perfect grains of ordinary size to pass between them. On the under side the bars are scarfed or rounded off, as seen at $y$, Fig. 6, detached drawing, to give a free passage to the upward current of air and prevent clogging. Each succeeding partition or grating is inclined in an opposite direction from the top of the cooler downward, so that the grain entering at the top of the box will be precipitated over the gratings from one to another, and from side to side until it reaches the exit-opening at the bottom, while at the same time there is a strong upward current of cool air passing up through it within the box, (caused by a connection at the top with an exhaust-fan,) by which the grain is cooled. When the grain reaches the bottom of the first cooling-box, it enters another elevator and is taken up to the second cooler, made in all respects like the first, from whence it leaves the entire apparatus in merchantable condition.

Throughout the above description reference is made to an exhaust-fan, of which there may be one or more at a convenient place or places in the building; or instead of a fan other efficient exhaust apparatus may be employed. This exhaust apparatus, of whatever character, is connected with the several machines and apparatus, as before indicated, by the several pipes A A′, &c. At first great difficulty was experienced in regulating and controlling the current of air at each and every point. The first essay to effect this was by slide-valves placed near the point where the pipes A, &c., joined the spouts; but this was found to sharpen the draft at that point, so as to draw up whole kernels of grain, and the air after passing the slide would slacken, and the pipes, especially those intended to draw off the wet bran, which sticks and clings wherever it can, would be in greater danger of choking. This embarassed the working of the machines, and aggravated rather than remedied a defect. To obviate these several practical difficulties, I have employed a throttle-valve placed within each pipe near the fan, and at some distance from the point of entrance. The form of this valve and its inclined position within the pipe allows the current of air to sweep both sides of it, so as to prevent the wet bran from accumulating and choking, while at the entrance of the pipe the current of air can be so much reduced as is required, so as just to separate and draw off all the foreign matter from the edible grain without taking up any of the latter. This arrangement is very important and necessary to the proper working of the exhaust in the pipes, through which solid matter is drawn. The force of the draft through pipes leading from the drying apparatus, where only moisture is borne along in the current, may be safely regulated by slide-valves. To reduce the current in all the pipes, or the force of the general exhaust, I have a regulating slide-valve opening a passage from the external air into the exhaust-chamber. This enables me to always have an excess of draft for emergencies. The bran, dust, &c., from the different processes is blown from the fan into any convenient receptacle at its maximum force, which is unvarying through the exit-pipe.

The cooling apparatus described in this specification may be employed as a drier (where the wet bran is separated immediately as it leaves the unbranners) by employing therein a current of heated air instead of cold air. In cases where it is determined to carry the bran through the drying apparatus with the grain it is separated from the grain on its passage through spout leading from the drier to the polisher, as and by an apparatus like that described connecting the exhaust with the spout that conveys the grain from the drier to the polisher. By having such a connection with the exhaust from this spout, provided with closing slides, throttle, &c., the machines can in a few moments, without stopping any portion of the apparatus or varying the feed of grain, be made to work either wet or dry—*i. e.*, separate the wet bran and dry the grain alone, or dry both grain and bran together and then separate them, and this by simply opening and closing of certain slides.

In cases where it is predetermined never to dry the bran with the grain, but to separate it as it leaves the unbranners, as described in the body of this specification, reels or revolving screens may be used in the drying-chamber, instead of stationary troughs, without changing the main principles of my improvements.

In connection with the drying-chamber I use thermometers at several points, the bulbs of which project into the interior, while the scales are visible from without, so that the temperature of the air passing through may be at any moment ascertained without opening the drying apparatus.

Having thus fully described my improvements in apparatus necessary to hull or unbran grain in accordance with my former patented invention, what I claim therein as new, and for which I desire to secure Letters Patent, is—

1. The employment of a conveyer-trough, substantially as herein described, with flights, as herein specified, for moistening the grain, and in combination with the conveyer the regulated water-discharge, as and for the purposes set forth.

2. The employment of an unbranner for removing the husk or bran from edible grain in a moist state, consisting of a horizontal cylinder with inclined revolving wings, constructed substantially as and for the purposes set forth.

3. In combination with a moistening apparatus and unbranner, the drying apparatus through which the grain is passed to be dried.

4. The construction of the drying apparatus, with its partitions, &c., by which the air is compelled to commingle with the grain, (either alone or in company with the detached bran or husk,) as herein specified.

5. Polishing the grain after it has been dried by passing it through an unbranning apparatus, as described.

6. Removing the bran, either in a moist or dry state, from one or all the points while passing through the apparatus, by means of exhaust apparatus applied substantially as and for the purpose herein set forth.

7. Regulating and controlling the current of air through the drier by means of the exhaust, as and for the purposes described.

8. The apparatus for cooling the grain constructed and arranged as herein set forth.

SAMUEL BENTZ.

Attest:
DANL. E. MYERS,
WM. HAND BROWNE.